US011200162B2

(12) United States Patent
Helmick et al.

(10) Patent No.: US 11,200,162 B2
(45) Date of Patent: Dec. 14, 2021

(54) CONDENSING LOGICAL TO PHYSICAL TABLE POINTERS IN SSDS UTILIZING ZONED NAMESPACES

(71) Applicant: Western Digital Technologies, Inc., San Jose, CA (US)

(72) Inventors: Daniel L. Helmick, Broomfield, CO (US); Liam Parker, Edinburgh (GB); Alan D. Bennett, Edinburgh (GB); Horst-Christoph Georg Hellwig, Innsbruck (AT)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/861,068

(22) Filed: Apr. 28, 2020

(65) Prior Publication Data

US 2021/0334203 A1 Oct. 28, 2021

(51) Int. Cl.
*G06F 12/02* (2006.01)
*G06F 12/0882* (2016.01)
*G06F 13/16* (2006.01)
*G06F 12/1045* (2016.01)

(52) U.S. Cl.
CPC ...... *G06F 12/0246* (2013.01); *G06F 12/0882* (2013.01); *G06F 12/1054* (2013.01); *G06F 13/1668* (2013.01); *G06F 2212/7201* (2013.01)

(58) Field of Classification Search
CPC ............ G06F 12/0246; G06F 12/0882; G06F 12/1009; G06F 12/1054; G06F 13/1668; G06F 2212/205; G06F 2212/7201
USPC .................. 711/103, 154, 203, 206, 209, 221
See application file for complete search history.

(56) References Cited

U.S. PATENT DOCUMENTS

| 9,122,585 | B2 | 9/2015 | Shim et al. | |
|---|---|---|---|---|
| 2008/0109589 | A1 | 5/2008 | Honda | |
| 2010/0332730 | A1* | 12/2010 | Royer, Jr. | ........... G06F 12/0246 711/103 |
| 2011/0072199 | A1* | 3/2011 | Reiter | ................. G06F 12/0246 711/103 |

(Continued)

OTHER PUBLICATIONS

International Search Report and the Written Opinion for International Application No. PCT/US2020/065159 dated Apr. 8, 2021, 11 pages.

*Primary Examiner* — Gary J Portka
(74) *Attorney, Agent, or Firm* — Patterson & Sheridan, LLP; Steven H. Versteeg (57) ABSTRACT

The present disclosure generally relates to methods of operating storage devices. The storage device comprises a controller, random-access memory (RAM), and a NVM unit, where in the NVM unit comprises a plurality of zones. The RAM unit comprises a logical to physical address (L2P) table for the plurality of zones. The L2P table comprises pointers that are associated with a logical block address (LBA) and the physical location of the data stored in the NVM. The L2P table comprises one pointer per erase block or zone. When a command is received to read data within the NVM, the controller reads the L2P table to determine the LBA and associated pointer of the data. The controller can then determine which zone or erase block the data is stored in, and calculates various offsets of wordlines, pages, and page addresses to find the exact location of the data in the NVM.

20 Claims, 6 Drawing Sheets

(56) References Cited

U.S. PATENT DOCUMENTS

2017/0046221 A1    2/2017  Bandic et al.
2020/0371718 A1*  11/2020  Chien .................. G06F 3/0653

* cited by examiner

CONDENSING LOGICAL TO PHYSICAL TABLE POINTERS IN SSDS UTILIZING ZONED NAMESPACES

BACKGROUND OF THE DISCLOSURE

Field of the Disclosure

Embodiments of the present disclosure generally relate to storage devices, such as solid state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. When a write command is received, the data associated with the write command has a logical block address (LBA). A logical to physical address (L2P) table stored in volatile memory of the SSD associates one or more LBAs of the data to a physical address of where the data is stored in the SSD when the data is written. The L2P table is updated whenever data is erased from the SSD to point to a sentinel value (e.g., "null"), such as during garbage collection operations.

In order to associate the LBA of the data to a physical address of where the data is stored in the SSD, the L2P table comprises pointers to point to or identify each location in the memory device, or to point to the sentinel value to indicate the data is invalid. Because data is written to the memory device sequentially, any modifications to the data requires a read-modify-write process, which can be a time consuming and burdensome process. In a read-modify-write process, data is read in about a 4 KiB or 8 KiB section and then modified in an about 512B section. The modified data is sequentially written to an available location in the memory unit. Though the previous data corresponding to the modified data may be erased, the L2P table comprises pointers that point to the physical location of the existing data. Since the storage device generally comprises a very limited amount of volatile memory, a large portion of the available volatile memory may be tied up with storing the L2P table.

Therefore, what is needed is a new method of improving data storage in a storage device.

SUMMARY OF THE DISCLOSURE

The present disclosure generally relates to methods of operating storage devices. The storage device comprises a controller, random-access memory (RAM), and a NVM unit, where in the NVM unit comprises a plurality of zones. The RAM unit comprises a logical to physical address (L2P) table for the plurality of zones. The L2P table comprises pointers that are associated with a logical block address (LBA) and the physical location of the data stored in the NVM. The L2P table comprises one pointer per erase block or zone. When a command is received to read data within the NVM, the controller reads the L2P table to determine the LBA and associated pointer of the data. The controller can then determine which zone or erase block the data is stored in, and calculates various offsets of wordlines, pages, and page addresses to find the exact location of the data in the NVM.

In one embodiment, a storage device comprises a non-volatile storage unit, wherein a capacity of the non-volatile storage unit is divided into a plurality of zones. The non-volatile storage unit comprises a plurality of dies and each of the plurality of dies comprising a plurality of erase blocks. The storage device further comprises a volatile memory unit, wherein the volatile memory unit stores a first logical to physical address table and the first logical to physical address table associates logical block addresses of data to a physical address of where the data is stored in the non-volatile storage unit. The storage device also comprises a controller coupled to the non-volatile storage unit and the volatile memory unit, wherein the controller is configured to receive a first read command to read first data stored in the non-volatile storage unit and read a first pointer in the first logical to physical table associated with the first data to determine the first data is stored in a first erase block of a first zone of the plurality of zones. The controller is further configured to determine an offset of pages and wordlines within the first erase block to find the first data and read the first data.

In another embodiment, a storage device comprises a non-volatile storage unit, wherein a capacity of the non-volatile storage unit is divided into a plurality of zones. The non-volatile storage unit comprises a plurality of dies and each of the plurality of dies comprising a plurality of erase blocks. Each of the erase blocks comprises a plurality of wordlines and pages. The storage device further comprises a volatile memory unit, wherein the volatile memory unit stores a first logical to physical address table and the first logical to physical address table associates logical block addresses of data to a physical address of where the data is stored in the non-volatile storage unit. The storage device also comprises a controller coupled to the non-volatile storage unit and the volatile memory unit, wherein the controller is configured to write first data associated with one or more first commands to a first erase block in a first zone of the plurality of zones and update the first logical to physical address table stored in the volatile memory unit, wherein updating the first logical to physical table comprises associating a pointer to the first zone and the first data. The controller is further configured to receive a read command to read the first data, identify a first logical block address of the first data, read the pointer associated with the first zone to determine the first data is stored within the first zone, calculate an offset of erase blocks to determine the first data is stored in the first erase block, and calculate an offset of pages and wordlines within the first erase block to find the first data.

In another embodiment, a storage device comprises a non-volatile storage unit, wherein a capacity of the non-volatile storage unit is divided into a plurality of zones. The non-volatile storage unit comprises a plurality of dies and each of the plurality of dies comprising a plurality of erase blocks. The storage device further comprises a volatile memory unit, wherein the volatile memory unit stores a first logical to physical address table and the first logical to physical address table associates logical block addresses of data to a physical address of where the data is stored in the non-volatile storage unit. The storage device also comprises means for receiving a first read command to read first data stored in the non-volatile storage unit, means for identifying a first logical block address of the first data, and means for reading a pointer in the first logical to physical table associated with the first zone to determine the first data is stored within a first zone of the plurality of zones. The storage device further comprises means for calculating an offset of erase blocks to determine the first data is stored in a first erase block of the first zone and means for calculating an offset of pages and wordlines within the first erase block to find the first data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller, random-access memory (RAM), and a NVM unit, where in the NVM unit comprises a plurality of zones. The RAM unit comprises a logical to physical address (L2P) table for the plurality of zones. The L2P table comprises pointers that are associated with a logical block address (LBA) and the physical location of the data stored in the NVM. The L2P table comprises one pointer per erase block or zone. When a command is received to read data within the NVM, the controller reads the L2P table to determine the LBA and associated pointer of the data. The controller can then determine which zone or erase block the data is stored in, and calculates various offsets of wordlines, pages, and page addresses to find the exact location of the data in the NVM.

Figure 1:
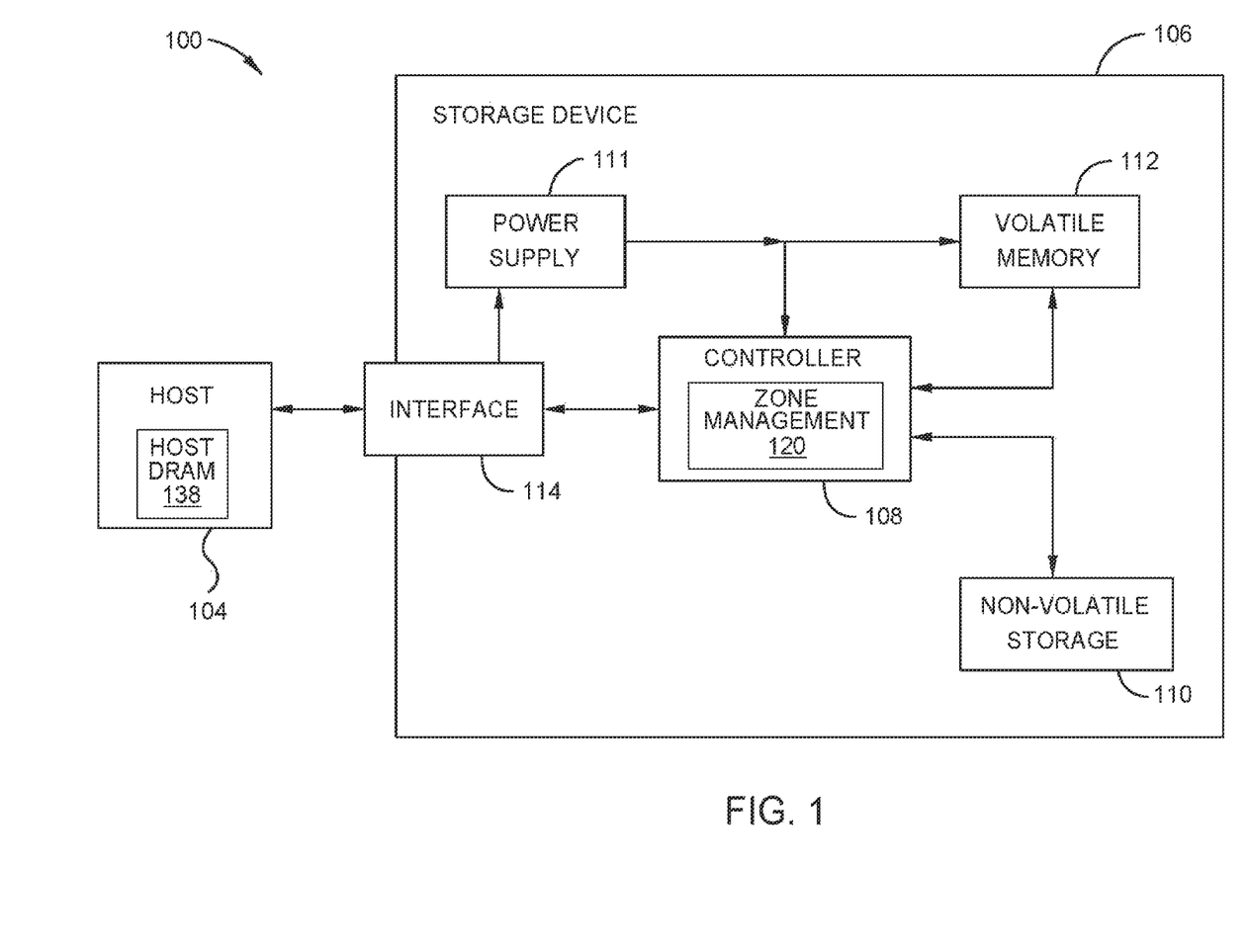
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a storage unit 110, such as non-volatile memory, included in storage device 106 to store and retrieve data. The storage unit 110 may be any type of non-volatile memory, such as MRAM, NAND, NOR, or HDD, for example. In the following descriptions, the storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, non-volatile memory 110 (NVM 110), a power supply 111, volatile memory 112, and an interface 114. The controller 108 comprises a zone management 120 and a buffer (not shown). In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, DDR5, LPDDR5, and the like)).

The various types of volatile memories may be used with different access properties. For example, DRAM 112 may be arranged for longer burst accesses to allow for improved bandwidth (BW) of the same access bus. Alternatively, DRAM 112 may be used with smaller accesses such that random small accesses may have better latency. The controller 108 comprises additional optional SRAM and/or embedded MRAM (not shown). Embedded MRAM (not shown) is another alternative memory that may be used in another embodiment. Similarly, the access to the MRAM (not shown) can be optimized for different design purposes, but the quantity of embedded MRAM (not shown) in the SSD controller 108 may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus 128. The controller 108 may comprise zone management (ZM) 120 to manage read and writes to zones, as well relocation of valid data to and from zones for garbage collection purposes. Zone metadata 122 may be stored in either the zone management 120 or the controller 108. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the buffer (not shown) before sending the data to the NVM 110.

Figure 2A:
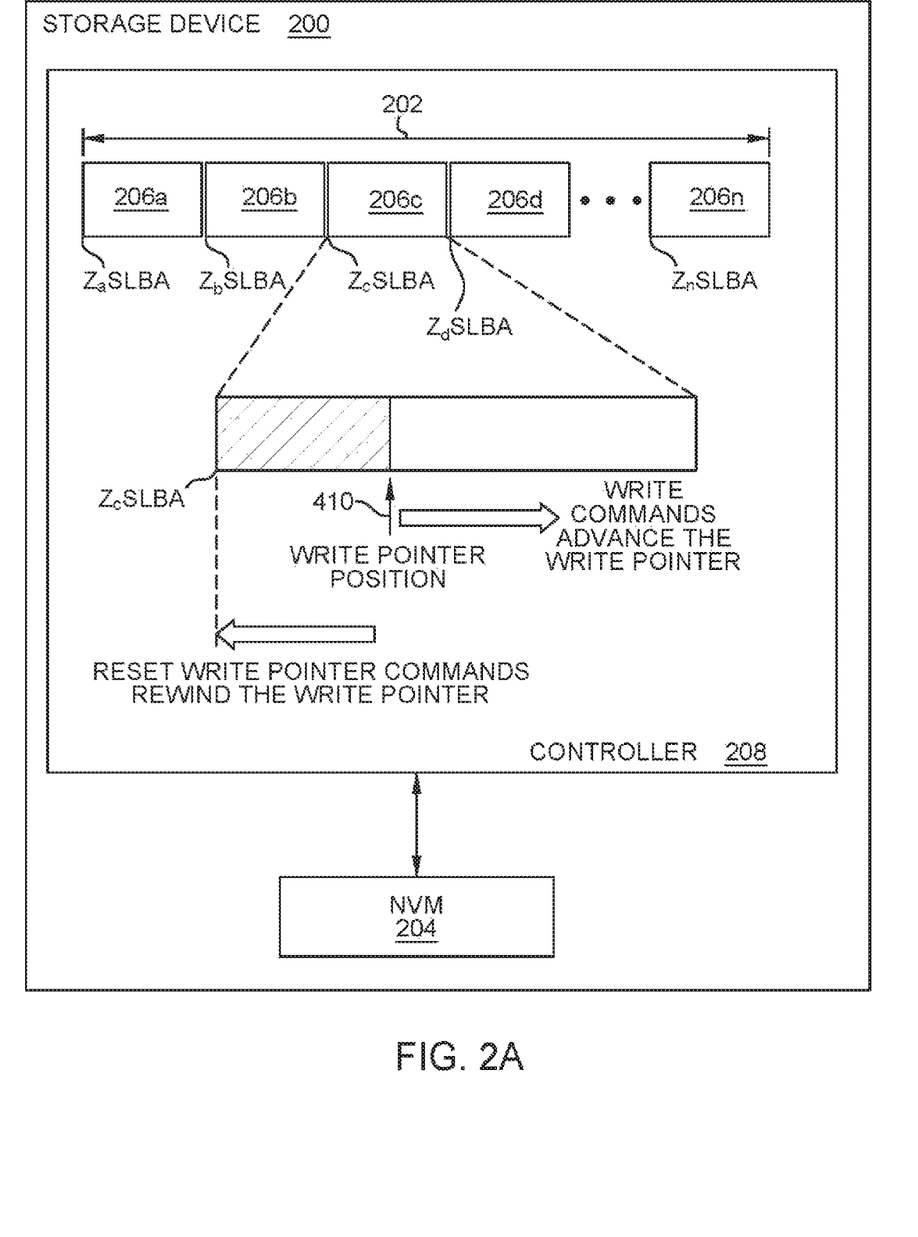
FIG. 2A illustrates a zoned namespace utilized in a storage device, according to one embodiment.
Figure 2B:
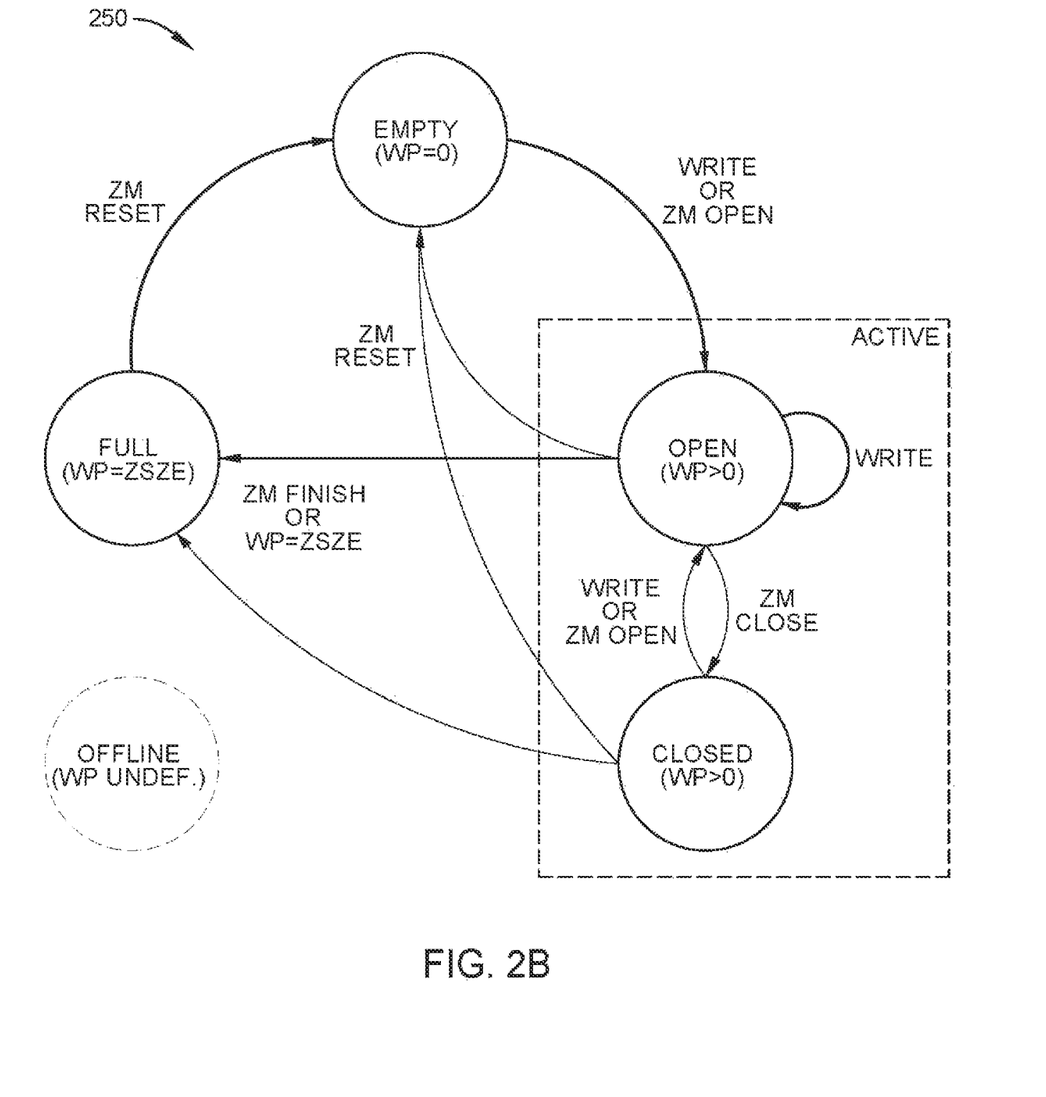
FIG. 2B illustrates a state diagram for the zoned namespaces of the storage device of FIG. 2A, according to one embodiment.

FIG. 2A illustrates a Zoned Namespaces (ZNS) 202 view utilized in a storage device 200, according to one embodiment. The storage device 200 may present the ZNS 202 view to a host device. FIG. 2B illustrates a state diagram 250 for the ZNS 202 of the storage device 200, according to one embodiment. The storage device 200 may be the storage device 106 of the storage system 100 of FIG. 1. The storage device 200 may have one or more ZNS 202, and each ZNS 202 may be different sizes. The storage device 200 may further comprise one or more conventional namespaces in addition to the one or more Zoned Namespaces 202. Moreover, the ZNS 202 may be a zoned block command (ZBC) for SAS and/or a zoned-device ATA command set (ZAC) for SATA. Host side zone activity may be more directly related to media activity in zoned drives due to the relationship of logical to physical activity possible.

In the storage device 200, the ZNS 202 is the quantity of NVM that can be formatted into logical blocks such that the capacity is divided into a plurality of zones 206a-206n (collectively referred to as zones 206). The NVM may be the storage unit or NVM 110 of FIG. 1. Each of the zones 206 comprise a plurality of physical or erase blocks (not shown) of a memory unit or NVM 204, and each of the erase blocks are associated a plurality of logical blocks (not shown). Each of the zones 206 may have a size aligned to the capacity of one or more erase blocks of a NVM or NAND device. When the controller 208 receives a command, such as from a host device (not shown) or the submission queue of a host device, the controller 208 can read data from and write data to the plurality of logical blocks associated with the plurality of erase blocks (EBs) of the ZNS 202. Each of the logical blocks is associated with a unique LBA or sector.

In one embodiment, the NVM 204 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity logical block address (LBA) sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

When a controller 208 selects the erase blocks that will store the data for each zone, the controller 208 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 208 may use the time difference to select a more optimal erase block in a just-in-time basis. The decision of which erase block is allocated and assigned for each zone and its contiguous LBAs can be occurring for zero or more concurrent zones at all times within the controller 208.

Each of the zones 206 is associated with a zone starting logical block address (ZSLBA) or zone starting sector. The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

FIG. 2B illustrates a state diagram 250 for the ZNS 202 of FIG. 2A. In the state diagram 250, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 208 comprises the ZM. Zone metadata may be stored in the ZM and/or the controller 208.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the storage device 200 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 308 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the parity data and one or more excluded erase blocks. For example, if the total capacity of a zone 206 is 512 MiB, the ZCAP may be 470 MiB, which is the capacity available to write data to, while 42 MiB are unavailable to write data. The writeable capacity (ZCAP) of a zone is equal to or less than the total zone storage capacity. The storage device 200 may determine the ZCAP of each zone upon zone reset. For example, the controller 208 or the ZM may determine the ZCAP of each zone. The storage device 200 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the storage device 200 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the storage device 200. The storage device 200 may mark one or more erase blocks for erasure. When a new zone is going to be formed and the storage device 200 anticipates a ZM open, the one or more erase blocks marked for erasure may then be erased. The storage device 200 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 210 for the zone 206 may be selected, enabling the zone 206 to be tolerant to receive commands out of sequential order. The write pointer 210 may optionally be turned off such that a command may be written to whatever starting LBA is indicated for the command.

Referring back to FIG. 2A, when the host sends a write command to write data to a zone 206, the controller 208 pulls-in the write command and identifies the write command as a write to a newly opened zone 206. The controller 208 selects a set of EBs to store the data associated with the write commands of the newly opened zone 206 to, and the newly opened zone 206 switches to an active zone 206. The write command may be a command to write new data, or a command to move valid data to another zone for garbage collection purposes. The controller 208 is configured to DMA read new commands from a submission queue populated by a host device.

In an empty zone 206 just switched to an active zone 206, the data is assigned to the zone 206 and the associated set of sequential LBAs of the zone 206 starting at the ZSLBA, as the write pointer 210 is indicating the logical block associated with the ZSLBA as the first available logical block. The data may be written to one or more erase blocks or NAND locations that have been allocated for the physical location of the zone 206. After the data associated with the write command has been written to the zone 206, a write pointer 210 is updated to point to the next LBA available for a host write (i.e., the completion point of the first write). The write data from this host write command is programmed sequentially into the next available NAND location in the erase block selected for physical backing of the zone.

For example, the controller 208 may receive a first write command to a third zone 206c, or a first zone append command. The host identifies sequentially which logical block of the zone 206 to write the data associated with the first command to. The data associated with the first command is then written to the first or next available LBA(s) in the third zone 206c as indicated by the write pointer 210, and the write pointer 210 is advanced or updated to point to the next available LBA available for a host write (i.e., WP>0). If the controller 208 receives a second write command to the third zone 206c, or a second zone append command, the data associated with the second write command is written to the next available LBA(s) in the third zone 206c identified by the write pointer 210. Once the data associated with the second command is written to the third zone 206c, the write pointer 210 once again advances or updates to point to the next available LBA available for a host write. Resetting the third zone 206c moves the write pointer 210 back to the $Z_c$SLBA (i.e., WP=0), and the third zone 206c switches to an empty zone.

Figure 3A:
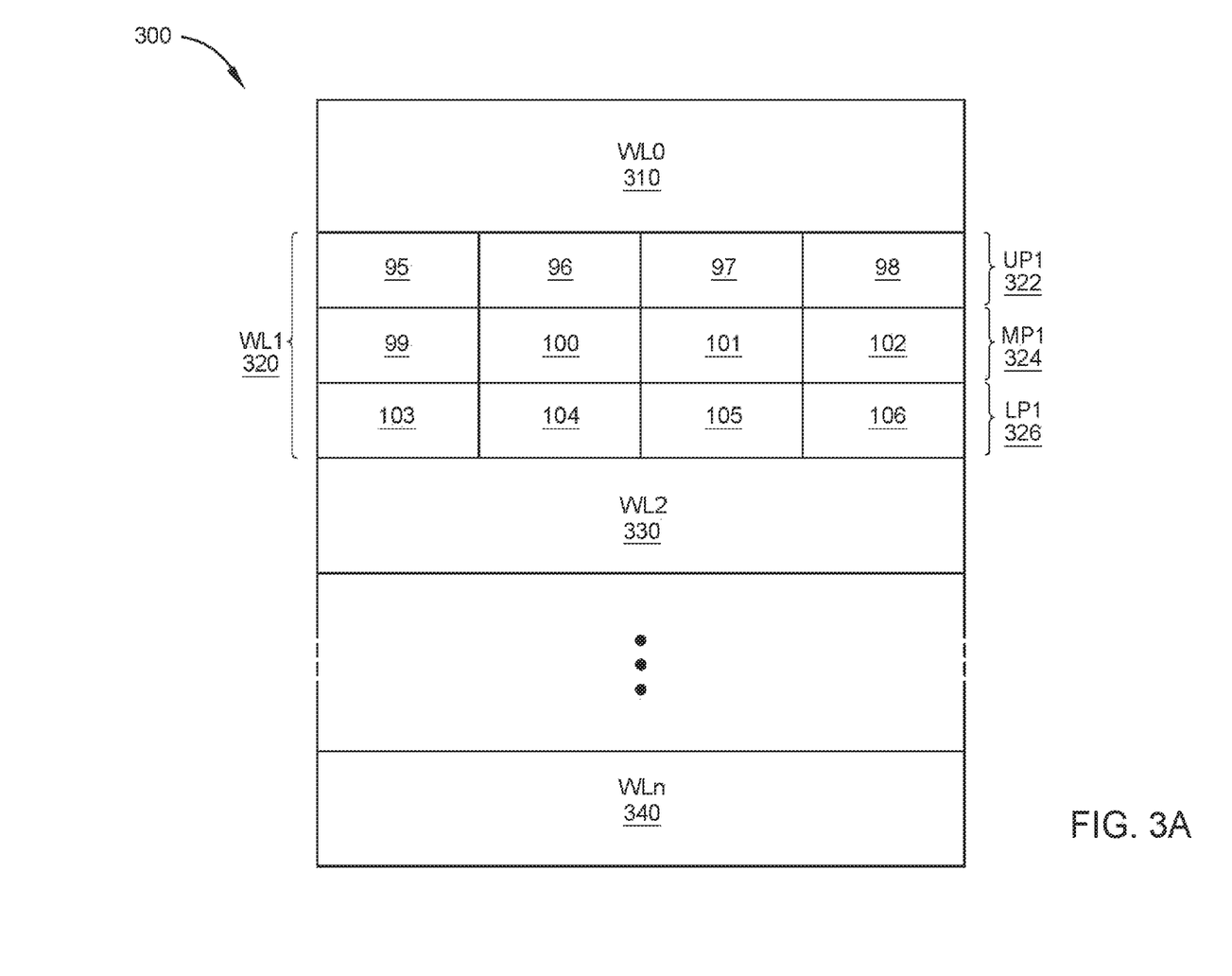
FIG. 3A illustrates an erase block of a zone, according to one embodiment.

FIG. 3A illustrates an erase block 300 of a zone, according to one embodiment. FIG. 3A is an example of an erase block 300 in a TLC memory. Other types of memory cells not listed may be applicable to the embodiment, as discussed above. The erase block 300 comprises multiple wordlines, such as WL0 310, WL1 320, WL2 330, and WLn 340. The letter "n" denotes a value applicable to the last wordline within an erase block 300. For example, an erase block 300 may be comprised of 256 wordlines. However, an erase block 300 may be comprised of more than 256 wordlines or less than 256 wordlines.

Furthermore, each wordline contains a number of pages, where the number corresponds to the type of memory cell. For example, a SLC memory has 1 page per wordline, a MLC memory has 2 pages per wordline, a TLC memory has 3 pages per wordline, and so forth. In FIG. 3A, the erase block 300 is TLC memory, and each wordline comprises an upper page, such as UP1 322, a middle page, such as MP1 324, and a lower page, such as LP1 476, as shown in WL1 470. Each page, such as UP1 322, comprises four NAND locations or four slots (e.g., page addresses), such as 95, 96, 97, and 98 of UP1 322, available for data storage. In the following description, a TLC memory erase block comprising 256 wordlines will be used as an example; however, such an example is for explanatory purposes only and is not intended to be limiting.

A slot may be considered a data code word, page address, or page offset, where the data code word size is 4,096 B+error detection code (EDC)+error correction code (ECC). The EDC may have a size of 8 B and the ECC may have a size of 128 B. Thus, the data code word size is 4,232 B. If a NAND page is 17,000 B, then four data code words (i.e., 16,928 B) may fit in the NAND page. A slot is an offset to reach any data code word by the page address. For example, the second data code word 96 of the upper page UP1 322 has an offset of a slot. However, the second data code word 96 may be addressed as a second slot 96 of the upper page UP1 322. Thus, a slot may be utilized interchangeably with data code word throughout the description for exemplary purposes.

Due to the fact that the original host data is 4,096 B or 4 KiB in size, and due to the fact that the EDC and ECC portions are optional and variable in size, the offset to reach each codeword may be referred to as 4 KiB herein. However, it should be generally understood that 4 KiB is actually 4,232 B in size in the examples discussed herein. In further example, the NAND pages may be referred to as 16 KiB in size, but the NAND pages are more accurately described as four of the 4,232 B data codewords plus some unused space. The unused space is the region between the 16,928 B and the 17,000 B in this example.

Data is written sequentially to each 4,232 B (i.e., 4 KiB) NAND location of the non-volatile storage unit in a size of one or more wordlines (i.e., a multiple of 48 KiB). For example, data is sequentially written to each 4 KiB NAND location of the upper page UP1 322, the middle page MP1 324, and the lower page LP1 326. Furthermore, data is written sequentially from wordline to wordline so that data is written to a WL0 310 before data is written to a WL1 320. As discussed above, data may be written to an erase block top to bottom (i.e., WL0 to WL1 to WL2, etc.) before moving to the next available erase block, or data may be written to one wordline (e.g., WL0) in each erase block before writing the next available wordline (e.g., WL1) in each erase block. Write commands of less than a wordline size are held in a controller buffer region, such as a temporary SRAM location dedicated to holding data in flight (i.e., host data not written to the NAND and/or parity data), until the aggregated size of the write commands is equal or greater than a wordline size.

In one embodiment, the partial writing of the data may be a 'foggy' write or programming. The partial writing may be a first pass program of the data. The second pass program of the data may be a 'fine' write, where the data is readable from the storage device. For example, first data may be 'foggy' written to a WL1 320, second data "foggy" written to a WL2 330, and then a fine re-write of the first data to the WL1 320. Data may be written to a NAND location or a slot or read from a NAND location or a slot in a size of about 4 KiB to about 16 KiB. However, erasing data occurs at an erase block level, where the erase block may comprise of 256 wordlines, 768 pages, or 3,072 NAND locations or 3,072 slots. In storage devices utilizing ZNS, erase blocks within a zone can only be erased when each erase block within the zone is erased. In other words, erase data in a zone occurs at a zone level.

Figure 3B:
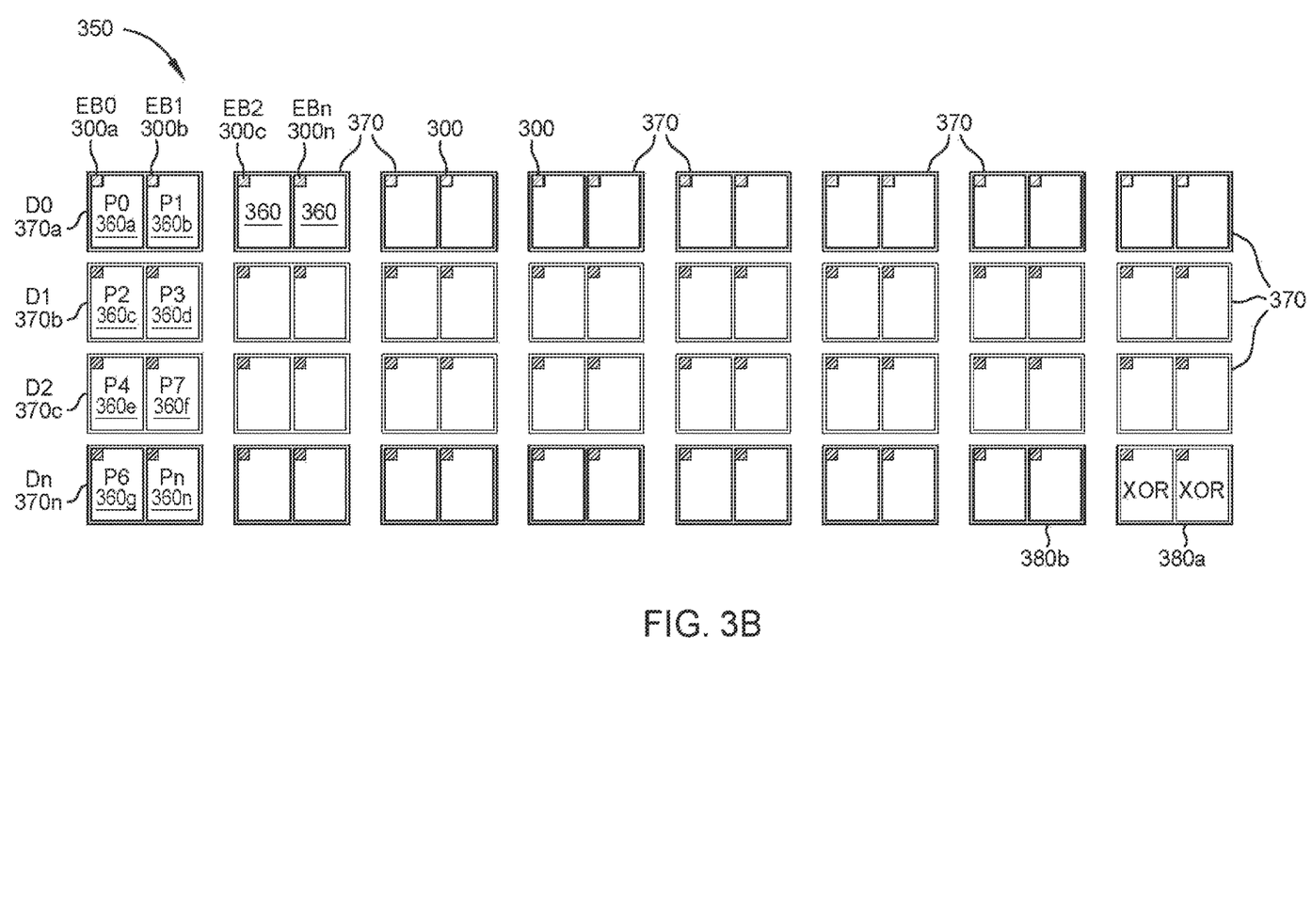
FIG. 3B illustrates a zone comprising one or more erase blocks, according to one embodiment.

FIG. 3B illustrates zone 350 comprising one or more erase blocks 300 of FIG. 3A, according to one embodiment. The zone 350 may be a zone 206 of the ZNS 202 of FIG. 3A. The zone 350 may be a zone of the NVM 110 of FIG. 1 coupled to the controller 108. A storage device, such as the storage device 106 of FIG. 1, is coupled to a memory device, such as the NVM 110 of FIG. 1, which comprises a plurality of zones, each comprising a plurality of dies 370. While 32 dies 370 are shown in the zone 350, any number of dies may be included. Each die 370, such as D0 370a, comprises a pair of planes 360, such as P0 360a and P1 360b, and each plane 360 comprises a plurality of erase blocks 300 of FIG. 3A, such as EB0 300a.

A zone 350 is formed by selecting an erase block 300 from each plane 360 of 31 out of the 32 dies 370 for user data storage, and assigning or associating the logical block address corresponding to the erase blocks 300 to the zone 350. In one embodiment, the zone 350 may contain 31 dies 370, 380b to be utilized for user data and 1 die 380a to be utilized for parity data. For example, RAID 4 utilizes 1 die for parity data. In another embodiment, the zone 350 may contain 30 dies 370 to be utilized for user data and 2 dies 380a, 380b to be utilized for parity data. For example, RAID 6 utilizes 2 dies for parity data. Such embodiments are not intended to be limiting nor restricting, and are examples of possible configurations of a zone 350. Furthermore, other embodiments neither listed nor described may exist.

Additionally, parity data for one wordline of each erase block storing user data (e.g., wordline 60 of each erase block of each plane of 30 or 31 dies) may be stored in a corresponding parity wordline (e.g., wordline 60) of any erase block where user data is not being stored in the parity wordline (e.g., wordline 60). In such an embodiment, parity wordlines may be stored in a plurality of different erase blocks, or planes, or dies within the zone 350. Furthermore, when programming to the non-volatile storage unit, a single plane of a die, instead of both planes of a die, may be programmed to the non-volatile storage unit. Moreover, while the die 380a being utilized to store parity data is shown as the last die 380a within the zone 350, any die 370, 380a, 380b may be used to stored parity data.

Within a zone 350, the parity die 380a is partitioned for the storage of parity or parity data for die failure protection. The parity die 380a may store p-parity data, which is the standard parity data, or may store q-parity data, which is the same size as the p-parity data. However, the q-parity data is calculated using Gaussian math on the host data stored on a particular wordline of each EB. The parity data includes erasure coding which may protect against one or more die failures and/or one or more plane failures. Erasure coding may also provide some amount of protection for plane loss failure.

In coding theory, an erasure code is a forward error correction (FEC) code under the assumption of bit erasures (rather than bit errors), which transforms a message of k symbols into a longer message (code word) with n symbols such that the original message can be recovered from a subset of the n symbols. Examples of various erasure code classes are tornado codes, fountain (i.e., rateless erasure) codes, parity, and Reed-Solomon codes. For example, the Reed-Solomon codes are a group of ECC, where the codes are able to detect and correct multiple symbol errors.

In one embodiment, the error correction information used by an ECC decoder to correct errors may refer to redundant and/or encoded bits generated by an encoder for an error correcting code. In various embodiments, an error correcting code may be one of various types of error correcting codes, such as a block code, a convolution code, a Bose-Chaudhuri-Hocquenghem (BCH) code, a low-density parity check (LDPC) code, a Hamming code, a Reed-Solomon code, a turbo code, or the like. The ECC may comprise EDC as well, where the EDC may be a sentinel value, a logical address, a Cyclical Redundancy Code (CRC), or any other ECC miscorrection check that will follow the ECC decode. The miscorrection check detects if the ECC has corrected a value to an invalid result. The miscorrection check is needed because there are instances where the ECC decodes to an incorrect value, but the EDC within the codeword has a known result or value to detect for these miscorrections.

Furthermore, data is written sequentially from erase block to erase block in a first zone so that data is written to EB0 300a before data is written to EB1 300b. Data is also written sequentially from zone to zone so that data is written from a first zone before data is written to a second zone. The zone 350 may have any writeable capacity (ZCAP), such as 256 MiB or 512 MiB, as discussed above. Each zone, such as a zone 350, of a plurality of zones has the same zone capacity. Data is erased in the zone capacity size when a device, such as the data storage device 106 of FIG. 1, utilizes ZNS. In other words, individual erase blocks cannot be erased unless an entire zone is erased or moved to the Zone Empty state (i.e., zone empty), as described in FIG. 2B. However, if the data storage device 106 comprises a non-volatile storage unit that has partial capability of ZNS, data is erased from the data storage device 106 in the zone capacity size in the portion of the non-volatile storage unit that has ZNS capability. Data may be erased from a non-ZNS capable non-volatile storage unit in an erase block size.

Furthermore, the location of the data stored in a ZNS-enabled portion of the NVM, such as the NVM 110 of FIG. 1, is recorded in a first logical to physical (L2P) table as LBAs in a volatile memory unit, such as the volatile memory unit 112. The location of the data stored in a non-ZNS-enabled portion of the NVM, such as the NVM 110 of FIG. 1, is recorded in a second L2P table as LBAs in a volatile memory unit, such as the volatile memory unit 112. The volatile memory unit 112 may be a DRAM unit. Furthermore, the NVM 110 comprises a first L2P table that matches the first L2P table of the volatile memory unit 112 and a second L2P table that matches the second L2P table of the volatile memory unit 112. The L2P tables in the NVM 110 are updated to match the L2P tables of the volatile memory unit 112.

The L2P tables comprise pointers that point to each physical location of the data within the NVM 110. Referring to FIG. 3A, in conventional or non-ZNS storage devices, a pointer is associated with each NAND location or each slot, such as slot 99, slot 100, slot 101, and slot 102 of MP1 324. The physical location of the data is mapped in a logical array, such that the pointer address array comprises the location mapped from die to NAND location. In an erase block, the total number of pointers is calculated as follows: 256 WL*3 Pages/WL*4 Slots/Page*1 pointer/slot=3,072 pointers. Within a first zone at capacity comprising 62 erase blocks, 190,464 pointers may exist (i.e., 3,072 pointers/erase block*62 erase blocks=190,464 pointers). Each pointer comprises a certain amount of data that utilizes the available storage of the DRAM 112 and the NVM 110.

By consolidating pointers, more memory in the DRAM 112 may be available, as the DRAM 112 is able to store a smaller L2P table. For example, in conventional or non-ZNS storage devices, an upper page, such as UP1 322 comprises 4 pointers associated with 4 slots or 4 NAND locations. Instead, in a storage device utilizing ZNS, if a pointer is only associated to the first NAND location or the first slot 99 in the MP1 324, the number of pointers of page decreases by 3 to 1. By utilizing a pointer to the first slot or first NAND location of a page, the pointer is associated with the start of a page. In order to access a second, third, or fourth slot or a second, third, or fourth NAND location in the MP1 324, an offset is calculated and utilized. For example, the second slot or second NAND location 100 of the MP1 324 utilizes the pointer pointing to the first slot or first NAND location slot 99 of the MP1 324 with an offset of 1. The third slot or third NAND location 100 of the MP1 324 utilizes the pointer pointing to the first slot or first NAND location slot 99 of the MP1 324 with an offset of 2. The fourth slot or fourth NAND location 100 of the MP1 324 utilizes the pointer pointing to the first slot or first NAND location slot 99 of the MP1 324 with an offset of 3.

Furthermore, when searching for a NAND location or a slot due to a first read command being received, such as to read data stored in the fourth slot 102, the controller 108 utilizes the L2P table to find the location of the relevant LBA associated with the physical address of the data to be read. Since the pointers are consolidated to each page, a pointer may reference slot 95 of UP1 322, slot 99 of MP1 324, or slot 103 of LP1 326. When the controller 108 searches for the LBA associated with slot 102, the controller 108 will determine that the pointer for slot 99 of MP1 324 is too low and the pointer for slot 103 of LP1 326 is too high. Thus, the controller 108 determines that the LBA of the data to be read is between slot 99 and slot 103 (e.g., within MP1 324). The controller 108 then utilizes the pointer associated with slot 99 of MP1 324 and incorporates a NAND location slot offset of 3 to obtain the target LBA associated with a first read command for the data stored in the fourth slot 102 of MP1 324.

Pointers may be further consolidated to incorporate the pages of a wordline. For example, the upper page, such as UP1 322, the middle page, such as MP1 324, and the lower page, such as 326 LP1, each comprise a pointer to the first slot or the first NAND location of the page (i.e., start of the page) from consolidating the NAND slots as previously described. The three pointers, each associated with a page, can be consolidated to one pointer that points to the start of a wordline, such as slot 95 of UP1 322. To reference a middle page, the pointer associated with an upper page is utilized with a page offset of 1. Likewise, to reference a lower page, the pointer associated with an upper page is utilized with a page offset of 2. Thus, each wordline would have one pointer that could be utilized to read data in any of the pages of the wordline and in any of the NAND locations or slots of the page.

Furthermore, when searching for a page of a wordline due to a first read command being received, such as to read data stored in the fourth slot 102 of the middle page MP1 324, the controller 108 utilizes the L2P table to find the location of the relevant LBA associated with the physical address of the data to be read. Since the pointers are consolidated to each wordline, a pointer may reference WL0 310, WL1 320, WL2 330, or WLn 340. When the controller 108 searches for the LBA associated within WL1 320, the controller 108 will determine that the pointer for WL1 320 is too low and the pointer for WL2 330 is too high. Thus, the controller 108 determines that the LBA of the data to be read is between WL1 320 and WL2 330 (e.g., within WL1 320). The controller 108 then performs the same process as discussed above to first determine which page the data is stored in, and then to determine which slot or NAND location the data is stored in by calculating the various offsets. The controller 108 then utilizes the pointer associated with WL1 320 and incorporates a page offset of 1 and a slot or NAND location offset of 3 to obtain the target LBA associated with a first read command in the fourth slot 102 of the middle page MP1 324.

Pointers may yet be further consolidated to incorporate the wordlines of an erase block. For example, WL0 310, WL1 320, WL2 330, and WLn 340 each comprise a pointer to the first slot or the first NAND location of the wordline (i.e., start of the wordline) from consolidating the pages as previously described. The pointers, each associated with a wordline, can be consolidated to one pointer that points to the start of an erase block, such WL0 310 of erase block 300. Furthermore, to reference a second wordline WL1 320, the pointer associated with the erase block is utilized with a wordline offset of 1. Likewise, to reference a third wordline WL2 330, the pointer associated with the erase block is utilized with a wordline offset of 2. Thus, each erase block would have one pointer that could be utilized to read data in any of the wordlines of the erase block.

When searching for a wordline of an erase block due to a first read command being received, such as to read data stored in the third WL2 330 of erase block 300, the controller 108 utilizes the L2P table to find the location of the relevant LBA associated with the physical address of the data to be read. The erase block 300 of FIG. 3A may be any of the erase blocks 300a-300n of FIG. 3B. Since the pointers are consolidated to each erase block, a pointer may reference erase block EB0 300a or another erase block, such as erase block EB1 300b of FIG. 3B.

If first erase block EB0 300a is the first erase block of a first zone 350 and a second erase block EB1 300b is the second erase block of a first zone 350, the controller 108 will determine that the pointer for the first erase block EB0 300a is too low and the pointer for second erase block EB1 300b is too high. Thus, the controller 108 determines that the LBA of the data to be read is between the first erase block EB0 300a and the second erase block EB1 300b (e.g., within the first erase block EB0 300a). The controller 108 then performs the same process as discussed above to first determine which wordline the data is stored in, then to determine which page the data is stored in, and then to determine which slot or NAND location the data is stored in by calculating the various offsets. The controller 108 utilizes the pointer associated with the first erase block EB0 300a and incorporates a wordline offset of 2 and the appropriate page and slot or NAND location offsets to obtain the target LBA associated with a first read command for the third wordline WL2 330.

In one embodiment, pointers may also be further consolidated to incorporate the erase blocks of a zone if each erase block of the zone has the same address in the plane (i.e., a third erase block of each plane of each die of a zone). For example, a first erase block 300a, a second erase block 300b, a third erase block 300c, and a fourth erase block 300n each comprise a pointer to the first slot or the first NAND location of the erase block (i.e., start of the erase block) from consolidating the wordlines as previously described. In some embodiments, the pointers, each associated with an erase block, can be consolidated to one pointer that points to the first physical location or starting physical location of a zone, such a first zone 350 and a second zone (not shown) (i.e., a first erase block of the zone or a first NAND location or a first slot of a first erase block of the zone). In other words, since a zone comprises a series of sequential LBAs, each zone may be associated with one pointer that points or indicates the first or starting physical location within the zone. Furthermore, to reference a second erase block EB1 300b, the pointer associated with the erase block is utilized with an erase block offset of 1. Likewise, to reference a third erase block EB2 300c, the pointer associated with the erase block is utilized with an erase block offset of 2.

When searching for an erase block of a zone due to a first read command being received, such as to read data stored in the second erase block EB1 300b of the first zone 350, the controller 108 utilizes the L2P table to find the location of the relevant LBA associated with the physical address of the data to be read. Since the pointers are consolidated to each zone, a pointer may reference a first or starting physical address of a first zone, a first or starting physical address of a second zone, and so-forth. When the controller 108 searches for the LBA associated with a second erase block EB1 300b, the controller 108 will determine that the pointer for the first or starting physical address of a first zone is too low and the pointer for first or starting physical address of a second zone is too high. Thus, the controller 108 determines that the LBA of the data to be read is between first zone and the second zone (e.g., within the first zone 350).

The controller 108 then performs the same process as discussed above to first determined which erase block the data is stored in, then to determine which wordline the data is stored in, then to determine which page the data is stored in, and then to determine which slot or NAND location the data is stored in by calculating the various offsets. The controller 108 utilizes the pointer associated with the first zone 350 and incorporates an erase block offset of 1 and the appropriate wordline, page, and slot or NAND location offsets to obtain the target LBA associated with a first read command for the second erase block EB1 300b of the first zone 350. Thus, each zone would have one pointer that could be utilized to read data in any of the erase blocks of the zone.

By consolidating pointers in a first L2P table configured for ZNS, the amount of pointers for a zone may decrease from a value of about 190,464 pointers per zone comprising 62 erase blocks to a value considerably less than about 190,464 pointers. The first L2P table may associate one pointer per zone such that a first or starting physical address of a first zone is associated with a first pointer, a first or starting physical address of a second zone is associated with a second pointer, and so-forth. The data within each zone can be found calculating various offsets. By decreasing the quantity of pointers in the first L2P table, more storage space may be utilized for storage of other data instead of storing pointers. In addition, the controller 108 utilizes logic controls to determine the location of data based off a pointer and various offsets.

Figure 4:
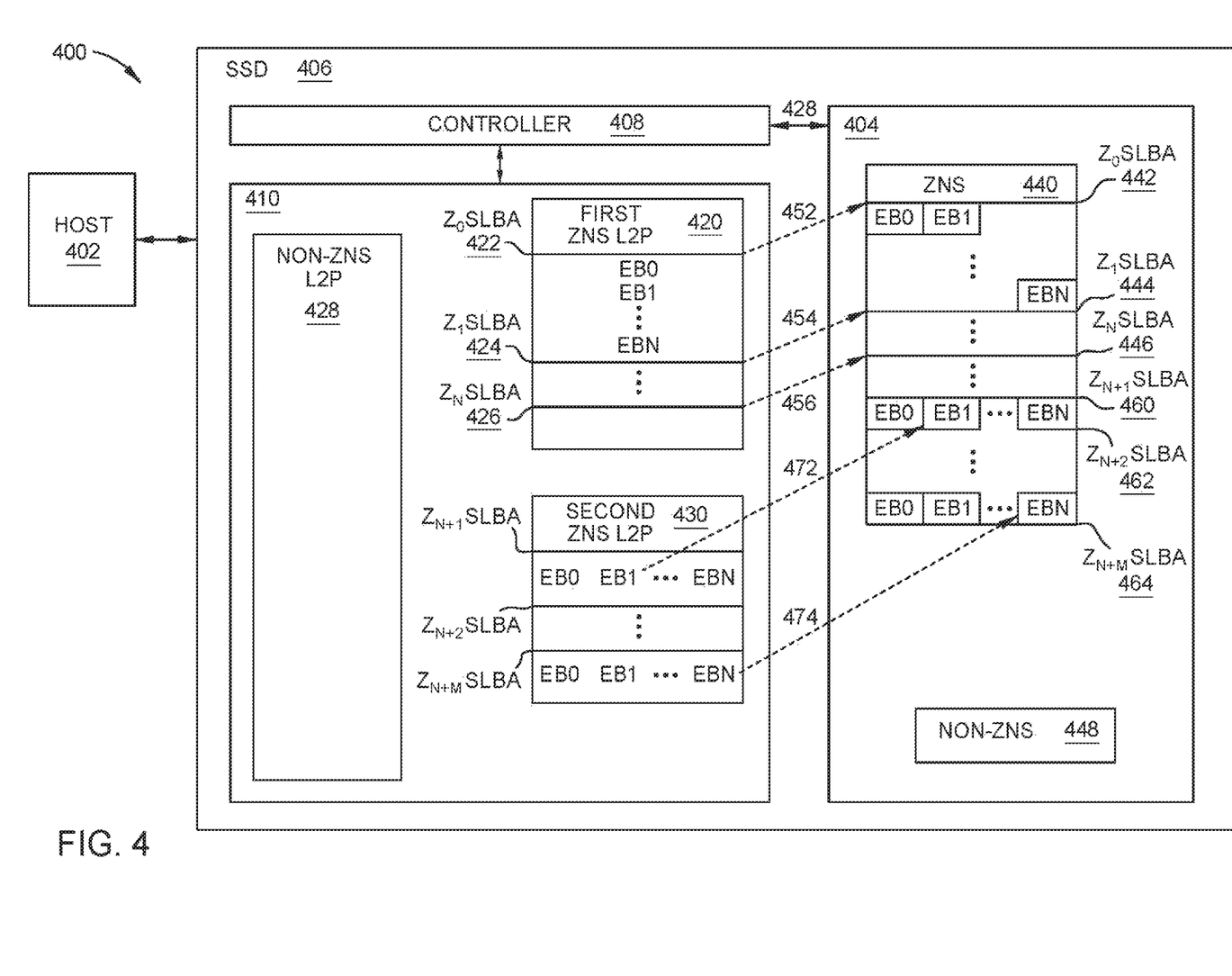
FIG. 4 is a schematic block diagram illustrating a storage system, according to another embodiment.

FIG. 4 is a schematic block diagram illustrating a storage system 400, according to another embodiment. The host 402 may be the host 104 of FIG. 1, the SSD 406 may be the storage device 106 of FIG. 1, the controller 408 may be the controller 108 of FIG. 1, a first RAM or volatile memory 410 (i.e., a first RAM1 memory), such as the DRAM, may be the volatile memory 112 of FIG. 1, and the NVM 404 may be the non-volatile memory 110 of FIG. 1. In the following descriptions, a first volatile memory 112 may be referenced to as DRAM memory for simplification and exemplary purposes.

The NVM 404 comprises a ZNS section 440 and a non-ZNS section 448.

The ZNS section 440 may comprise any number of zones, such as a first zone 442, a second zone 444, and an $n^{th}$ zone 446. The ZNS section 440 may comprising zones of different sizes or capacities. For example, the first zone 442, the second zone 445, and third zone 446 may have a first size or capacity, while a fourth zone 460, a fifth zone 462, and a sixth zone 464 have a second size or capacity different than the first size or capacity. The DRAM 410 comprises one or more first ZNS L2P tables (first ZNS L2P table 420 shown) and one or more non-ZNS L2P tables 428. The first ZNS L2P table 420 comprise a pointer to the first or starting physical address of each zone, such that a pointer is associated with each zone start LBA (ZSLBA). A ZSLBA may be $Z_0$SLBA 422, $Z_1$SLBA 424, or $Z_N$SLBA 426, where "N" is an integer. The DRAM 410 may further comprise one or more second ZNS L2P tables (second L2P table 430 shown). The second ZNS L2P table 430 comprises a pointer to each erase block within each zone, as discussed further below. The zones in the L2P tables may be in any order, such that a second zone is listed before a first zone.

Furthermore, the NVM 404 comprises one or more ZNS L2P tables (not shown) and one or more non-ZNS L2P table (not shown). The L2P tables in the NVM 404 are periodically updated to match the L2P tables 420, 428, 430 of the volatile memory unit 112. In one embodiment, the controller 408 may access sections of the L2P table residing in the NVM 404 instead of the L2P tables 420, 428, 430 residing in the DRAM 410.

The DRAM 410 may have a limited data storage space, as the DRAM 410 is smaller than the NVM 404. The data storage space of the DRAM 410 and the NVM 404 may either comprise a ZNS L2P table(s) and a ZNS section, a non-ZNS L2P table(s) and a non-ZNS section, or both a ZNS L2P table(s), a ZNS section, a non-ZNS L2P table(s), and a non-ZNS section. If the data storage space of the DRAM 410 or NVM 404 comprises a ZNS L2P table(s) and a ZNS section 440, then the controller 408 may consolidate pointers in each ZNS L2P table (i.e., the first pointer 452 to the first or starting physical address of the first zone 442, a second pointer 454 to the first or starting physical address of the second zone 444, and an $n^{th}$ pointer 456 to the first or starting physical address of the $n^{th}$ zone 446). However, the non-ZNS L2P tables are configured to operate in a conventional setting, without ZNS.

In a DRAM 410 that comprises both a first ZNS L2P table 420 and a second non-ZNS L2P table 428, the first ZNS L2P table 420 may comprise all the zones minus three zones, where the erase blocks that would be in the three zones are associated with the second non-ZNS L2P table 428. The second non-ZNS L2P table 428 may only be about 1% of the DRAM 410 capacity with a 4K L-page size. If the DRAM 410 comprises only a second non-ZNS L2P table 428, such as a conventional volatile memory operation, the capacity may be limited by a 128K L-page size. The previous values listed are not intended to be limiting, but to provide an example of a possible embodiment.

The DRAM 410 may comprise one or more ZNS L2P tables, such that each ZNS L2P table may refer to different sized zones. For example, a first ZNS L2P table 420 may refer to a zone comprising two erase blocks from each plane of each die, whereas a second ZNS L2P table 430 may refer to a zone comprising one erase block from each plane of each die. In one embodiment, a pointer points to the first or starting physical address of each zone. In another embodiment, a pointer points to each erase block of a zone. For example, in the first ZNS L2P table 420, pointer 452 points to the first or starting physical address of the first zone 442, pointer 454 table 420 points to the first or starting physical address of the second zone 444, and pointer 456 points to the first or starting physical address of the $n^{th}$ zone 456. However, in the second L2P table 430, pointer 472 points to the second erase block EB1 of the N+1 zone 460 and pointer 474 points to the nth erase block EBN of the N+M zone 464, where "M" is an integer. In the embodiment where a pointer points to each erase block of a zone, the various page and slots offsets are still calculated, as discussed above.

In one embodiment, the DRAM 410 comprises both a first ZNS L2P table 420 and a second non-ZNS L2P table 428. A first write data associated with one or more first commands to the NVM 404 is received by the controller to write data to a fourth slot or a fourth NAND location of a third page of a third wordline of a first erase block EB0 of a first zone 442. The physical location of the data is stored as a LBA in a first ZNS L2P table 420. Since the LBA is stored in the first ZNS L2P table 420, a first pointer 452 associated with the first zone 442 is associated with the location of the first write data.

However, when a first read command associated with the first write data to the NVM 404 is received by the controller, the first write data may be referenced by the first pointer 452 to the first zone 442 with an erase block offset of 0 for the first erase block EB0, as described above. The first write data may further be referenced by the first pointer 452 to the first erase block EB0 with a wordline offset of 2 for the third wordline, as described above. The first write data may be referenced by the first pointer 452 to the third wordline with a page offset of 2 for the third page, as described above. The first write data may further be referenced by the first pointer 452 to the third page with a slot or NAND location offset of 3 for the fourth slot or fourth NAND location of the third page, as described above.

If one or more commands to write first data to the NVM 404 are received by the controller to write the first data to a fourth slot or a fourth NAND location of a third page of a third wordline of a first erase block within the non-ZNS section, a pointer exists in the non-ZNS L2P table 428 for every sub-location of the data (e.g., a pointer for each NAND location or slot associated with the first write data or a pointer to 4K or 8K sizes of data within an erase block).

In order to conserve space in a DRAM of a storage device utilizing ZNS, where the LBAs are stored in a ZNS L2P table, pointers may be consolidated to the first value of each sub-section such as a first zone, a first erase block, a first wordline, a first page, and a first NAND location or a first slot. Various offsets may be utilized with the pointer associated with a first value to determine the location of data stored in the ZNS. The consolidation of pointers decreases the amount of memory dedicated to the pointer data in the DRAM, which decreases the need for a larger DRAM unit or allows for other data to be stored in the DRAM.

In one embodiment, a storage device comprises a non-volatile storage unit, wherein a capacity of the non-volatile storage unit is divided into a plurality of zones. The non-volatile storage unit comprises a plurality of dies and each of the plurality of dies comprising a plurality of erase blocks. The storage device further comprises a volatile memory unit, wherein the volatile memory unit stores a first logical to physical address table and the first logical to physical address table associates logical block addresses of data to a physical address of where the data is stored in the non-volatile storage unit. The storage device also comprises a controller coupled to the non-volatile storage unit and the volatile memory unit, wherein the controller is configured to receive a first read command to read first data stored in the non-volatile storage unit and read a first pointer in the first logical to physical table associated with the first data to determine the first data is stored in a first erase block of a first zone of the plurality of zones. The controller is further configured to determine an offset of pages and wordlines within the first erase block to find the first data and read the first data.

The volatile memory unit stores a second logical to physical table. The first logical to physical table is for the plurality of zones and the second logical to physical table is for a non-zoned namespace. The controller is configured to track which erase blocks are within each zone. The first logical to physical table comprises a pointer for each erase block within each zone. Determining the offset of pages and wordlines within the first erase block comprises scanning the logical black addresses stored in the first logical to physical table by page size and by wordline size. Data for each zone is written to each erase block of the zone sequentially.

In another embodiment, a storage device comprises a non-volatile storage unit, wherein a capacity of the non-volatile storage unit is divided into a plurality of zones. The non-volatile storage unit comprises a plurality of dies and each of the plurality of dies comprises a plurality of erase blocks. Each of the erase blocks comprises a plurality of wordlines and pages. The storage device further comprises a volatile memory unit, wherein the volatile memory unit stores a first logical to physical address table and the first logical to physical address table associates logical block addresses of data to a physical address of where the data is stored in the non-volatile storage unit. The storage device also comprises a controller coupled to the non-volatile storage unit and the volatile memory unit, wherein the controller is configured to write first data associated with one or more first commands to a first erase block in a first zone of the plurality of zones and update the first logical to physical address table stored in the volatile memory unit, wherein updating the first logical to physical table comprises associating a pointer to the first zone and the first data. The controller is further configured to receive a read command to read the first data, identify a first logical block address of the first data, read the pointer associated with the first zone to determine the first data is stored within the first zone, calculate an offset of erase blocks to determine the first data is stored in the first erase block, and calculate an offset of pages and wordlines within the first erase block to find the first data.

The controller is further configured to write second data associated with one or more second commands sequentially to a second erase block in the first zone, update the first logical to physical address table stored in the volatile memory unit, wherein updating the logical to physical table comprises associating the pointed to the first zone and the second data, and identify a second logical block address of the second data. The controller is also configured to read the pointer associated with the first zone to determine the second data is stored within the first zone, calculate an offset of erase blocks to determine the second data is stored in the second erase block, and calculate an offset of pages and wordlines within the second erase block to find the second data. The first logical to physical table stores one pointer per zone. Each pointer points to or indicates a first or starting physical address of each zone. The non-volatile memory further comprises a non-zoned namespace. The volatile memory unit stores a second logical to physical address table for the non-zoned namespace. Calculating the offset of erase blocks comprises scanning the logical block addresses stored in the first logical to physical table by erase block size, and wherein calculating the offset of pages and wordlines within the first erase block comprises scanning the logical black addresses stored in the first logical to physical table by page size and by wordline size. The volatile memory unit stores a third logical to physical table. The first logical to physical table comprises pointers for the first zone and one or more first zones having a first capacity and the third logical to physical table comprises pointers for one or more second zones having a second capacity different than the first capacity.

In another embodiment, a storage device comprises a non-volatile storage unit, wherein a capacity of the non-volatile storage unit is divided into a plurality of zones. The non-volatile storage unit comprises a plurality of dies and each of the plurality of dies comprising a plurality of erase blocks. The storage device further comprises a volatile memory unit, wherein the volatile memory unit stores a first logical to physical address table and the first logical to physical address table associates logical block addresses of data to a physical address of where the data is stored in the non-volatile storage unit. The storage device also comprises means for receiving a first read command to read first data stored in the non-volatile storage unit, means for identifying a first logical block address of the first data, and means for reading a pointer in the first logical to physical table associated with the first zone to determine the first data is stored within a first zone of the plurality of zones. The storage device further comprises means for calculating an offset of erase blocks to determine the first data is stored in a first erase block of the first zone and means for calculating an offset of pages and wordlines within the first erase block to find the first data.

The means for calculating the offset of erase blocks is configured to scan the logical block addresses stored in the first logical to physical table by erase block size. The means for calculating the offset of pages and wordlines is configured to scan the logical black addresses stored in the first logical to physical table by page size and by wordline size. Data is written to each zone sequentially. The pointer associated with the first zone points to or indicates a first or starting physical address of the first zone. The non-volatile memory further comprises a non-zoned namespace. The volatile memory unit stores a second logical to physical address table for the non-zoned namespace. The controller is configured to track which erase blocks are within each zone and how many logical block addresses are within each erase block.

While the foregoing is directed to embodiments of the present disclosure, other and further embodiments of the disclosure may be devised without departing from the basic scope thereof, and the scope thereof is determined by the claims that follow.

What is claimed is:
1. A storage device, comprising:
a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
a volatile memory unit, wherein the volatile memory unit stores a first logical to physical address table and a second logical to physical table, the first logical to physical address table associating logical block addresses of data to a physical address of where the data is stored in the non-volatile storage unit, wherein the first logical to physical table is for the plurality of zones and the second logical to physical table is for a non-zoned namespace; and a controller coupled to the non-volatile storage unit and the volatile memory unit, wherein the controller is configured to:
receive a first read command to read first data stored in the non-volatile storage unit;
read a first pointer in the first logical to physical table associated with the first data to determine the first data is stored in a first erase block of a first zone of the plurality of zones;
determine an offset of pages and wordlines within the first erase block to find the first data; and
read the first data.

2. The storage device of claim 1, wherein the controller is configured to track which erase blocks are within each zone.

3. The storage device of claim 1, wherein the first logical to physical table comprises a pointer for each erase block within each zone.

4. The storage device of claim 1, wherein determining the offset of pages and wordlines within the first erase block comprises scanning the logical block addresses stored in the first logical to physical table by page size and by wordline size.

5. The storage device of claim 1, wherein data for each zone is written to each erase block of the zone sequentially.

6. A storage device, comprising:
a non-volatile storage unit, wherein a capacity of the non-volatile storage unit is divided into a plurality of zones, and wherein the non-volatile storage unit comprises a plurality of dies, each of the plurality of dies comprising a plurality of erase blocks, and each of the erase blocks comprising a plurality of wordlines and pages;
a volatile memory unit, wherein the volatile memory unit stores a first logical to physical address table, the first logical to physical address table associating logical block addresses of data to a physical address of where the data is stored in the non-volatile storage unit; and
a controller coupled to the non-volatile storage unit and the volatile memory unit, wherein the controller is configured to:
write first data associated with one or more first commands to a first erase block in a first zone of the plurality of zones;
update the first logical to physical address table stored in the volatile memory unit, wherein updating the first logical to physical table comprises associating a pointer to the first zone and the first data;
receive a read command to read the first data;
identify a first logical block address of the first data;
read the pointer associated with the first zone to determine the first data is stored within the first zone;
calculate an offset of erase blocks to determine the first data is stored in the first erase block; and
calculate an offset of pages and wordlines within the first erase block to find the first data.

7. The storage device of claim 6, wherein the controller is further configured to:
write second data associated with one or more second commands sequentially to a second erase block in the first zone;
update the first logical to physical address table stored in the volatile memory unit, wherein updating the logical to physical table comprises associating the pointer to the first zone and the second data;
identify a second logical block address of the second data;
read the pointer associated with the first zone to determine the second data is stored within the first zone;
calculate an offset of erase blocks to determine the second data is stored in the second erase block; and
calculate an offset of pages and wordlines within the second erase block to find the second data.

8. The storage device of claim 6, wherein the first logical to physical table stores one pointer per zone, and wherein each pointer points to or indicates a first or starting physical address of each zone.

9. The storage device of claim 6, wherein the non-volatile memory further comprises a non-zoned namespace, and wherein the volatile memory unit stores a second logical to physical address table for the non-zoned namespace.

10. The storage device of claim 6, wherein calculating the offset of erase blocks comprises scanning the logical block addresses stored in the first logical to physical table by erase block size, and wherein calculating the offset of pages and wordlines within the first erase block comprises scanning the logical block addresses stored in the first logical to physical table by page size and by wordline size.

11. The storage device of claim 6, wherein the volatile memory unit stores a third logical to physical table.

12. The storage device of claim 11, wherein the first logical to physical table comprises pointers for the first zone and one or more first zones having a first capacity and the third logical to physical table comprises pointers for one or more second zones having a second capacity different than the first capacity.

13. A storage device, comprising:
a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
a volatile memory unit, wherein the volatile memory unit stores a first logical to physical address table, the first logical to physical address table associating logical block addresses of data to a physical address of where the data is stored in the non-volatile storage unit;
means for receiving a first read command to read first data stored in the non-volatile storage unit;
means for identifying a first logical block address of the first data;
means for reading a pointer in the first logical to physical table associated with a first zone of the plurality of zones to determine the first data is stored within a first zone of the plurality of zones;
means for calculating an offset of erase blocks to determine the first data is stored in a first erase block of the first zone, wherein the means for calculating the offset of erase blocks is configured to scan the logical block addresses stored in the first logical to physical table by erase block size; and
means for calculating an offset of pages and wordlines within the first erase block to find the first data.

14. The storage device of claim 13, wherein the means for calculating the offset of pages and wordlines is configured to scan the logical block addresses stored in the first logical to physical table by page size and by wordline size.

15. The storage device of claim 13, wherein the pointer associated with the first zone points to or indicates a first or starting physical address of the first zone.

16. The storage device of claim 13, wherein the non-volatile memory further comprises a non-zoned namespace, and wherein the volatile memory unit stores a second logical to physical address table for the non-zoned namespace.

17. The storage device of claim 13, wherein the controller is configured to track which erase blocks are within each zone and how many logical block addresses are within each erase block.

18. The storage device of claim 13, wherein the volatile memory unit stores a third logical to physical table, and wherein the first logical to physical table comprises pointers for the first zone and one or more first zones having a first capacity and the third logical to physical table comprises pointers for one or more second zones having a second capacity different than the first capacity.

19. The storage device of claim 1, wherein reading the first pointer in the first logical to physical table associated with the first data to determine the first data is stored in the first erase block of the first zone further comprises calculating an offset of erase blocks to determine the first data is stored in the first erase block.

20. The storage device of claim 1, wherein the volatile memory unit stores a third logical to physical table, and wherein the first logical to physical table comprises pointers for the first zone and one or more first zones having a first capacity and the third logical to physical table comprises pointers for one or more second zones having a second capacity different than the first capacity.

* * * * *